United States Patent
Kamatani et al.

(10) Patent No.: US 8,602,665 B2
(45) Date of Patent: Dec. 10, 2013

(54) LENS MODULE AND CAMERA

(75) Inventors: Yoshiteru Kamatani, Kanagawa (JP); Takehisa Ishida, Tokyo (JP); Nobuyuki Nagai, Kanagawa (JP); Yusaku Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 120 days.

(21) Appl. No.: 13/184,978

(22) Filed: Jul. 18, 2011

(65) Prior Publication Data

US 2012/0027398 A1 Feb. 2, 2012

(30) Foreign Application Priority Data

Jul. 29, 2010 (JP) ................................. 2010-170016

(51) Int. Cl.
*G03B 17/00* (2006.01)
*G02B 7/02* (2006.01)

(52) U.S. Cl.
USPC ......................................... 396/529; 359/823

(58) Field of Classification Search
USPC ......................................... 396/529; 359/823
See application file for complete search history.

(56) References Cited

U.S. PATENT DOCUMENTS

| | | | |
|---|---|---|---|
| 2006/0140609 A1* | 6/2006 | Chen ................................ | 396/85 |
| 2006/0215053 A1* | 9/2006 | Kinoshita ..................... | 348/335 |
| 2006/0215283 A1 | 9/2006 | Makii | |
| 2007/0077052 A1* | 4/2007 | Chang ........................... | 396/144 |
| 2007/0212050 A1* | 9/2007 | Chiang .......................... | 396/144 |
| 2009/0091829 A1 | 4/2009 | Nagai et al. | |
| 2009/0185284 A1* | 7/2009 | Tsai .............................. | 359/694 |
| 2009/0295986 A1 | 12/2009 | Topliss et al. | |
| 2010/0060778 A1 | 3/2010 | Tsuchiya et al. | |
| 2010/0067130 A1* | 3/2010 | Kim et al. ..................... | 359/824 |
| 2010/0079032 A1 | 4/2010 | Suzuki | |
| 2011/0030368 A1 | 2/2011 | Kume | |

FOREIGN PATENT DOCUMENTS

WO WO 2009/069569 A1 6/2009
WO WO 2009/076477 A1 6/2009

OTHER PUBLICATIONS

Extended Search Report issued Nov. 4, 2011 in European Patent Application No. 111741567-1234.

* cited by examiner

*Primary Examiner* — Clayton E Laballe
*Assistant Examiner* — Noam Reisner
(74) *Attorney, Agent, or Firm* — Oblon, Spivak, McClelland, Maier & Neustadt, L.L.P.

(57) ABSTRACT

A lens module includes: a lens forming an image of an object; a lens holder to hold an outer peripheral side of the lens to allow reciprocal movement in an optical axis direction of the lens; a housing at least one end side of which is opened, which includes a cylindrical receiving part having an inner surface, one surface of which, at a lateral side, contacts one surface of the lens holder at the lateral side perpendicular to the optical axis direction, and which receives the lens holder in the receiving part to allow reciprocal movement in the optical axis direction of the lens and in a sliding state; and an actuator part including a movable part which is displaced by a displacement amount corresponding to a level of an applied drive voltage and reciprocates the lens holder received in the housing between a first position and a second position in the optical axis direction.

10 Claims, 7 Drawing Sheets

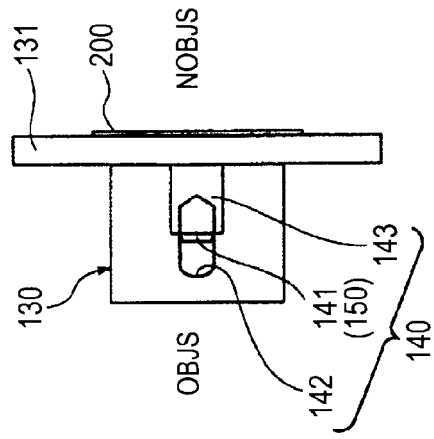
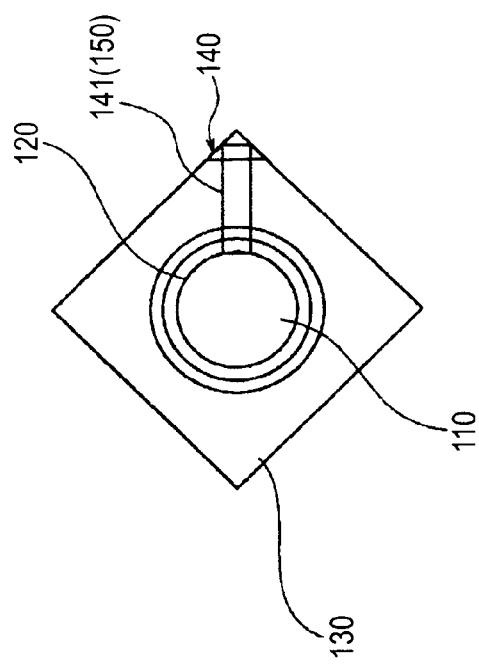
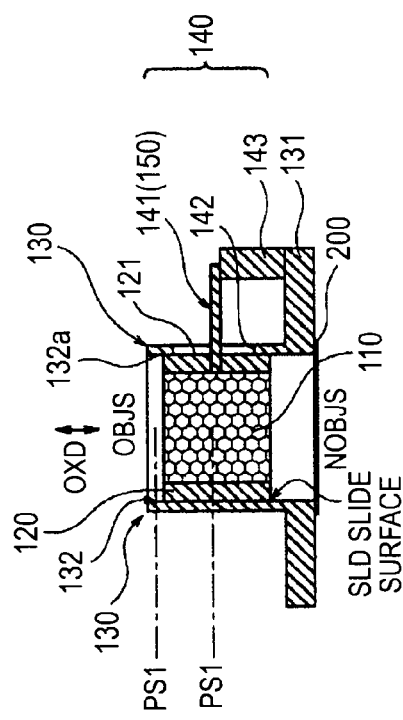

CASE OF POLYMER ACTUATOR

CASE OF BIMORPH (BIMETAL) PZT

CASE OF SHAPE-MEMORY-ALLOY WIRE

LENS MODULE AND CAMERA

FIELD

The present disclosure relates to a lens module and a camera, which includes a lens holder to hold a lens so as to allow reciprocal movement of the lens.

BACKGROUND

In order to realize auto focusing of a camera module, a lens is required to be reciprocated in an object direction.

In general, the lens module includes a plate spring having a complicated shape at an upper and a lower part in order to support a lens holder including the lens.

FIG. 1 is a view showing a lens module of a general VCM (Voice Coil Motor) system.

The lens module 1 of FIG. 1 includes three lenses 2, 3 and 4, a lens holder 5 to adjust optical axes of the lenses 2 to 4 and to hold them, a yoke 6 arranged at an outer peripheral side of the lens holder, a magnet 6, a coil 7, and plate springs 8 and 9 to support the lens holder 5.

These parts are mounted on a base 10.

In this lens module 1, it is necessary that the respective parts of the plate springs 8 and 9 are processed to have high concentricity between the outer diameter and the inner diameter, and further, when assembled, it is necessary that the concentricity between the plate springs 8 and 9 is high.

Besides, when the lens holder 5 is not located at the center of the plate springs 8 and 9 with high accuracy, the center of gravity shifts to generate a tilt, and a partial blur occurs.

SUMMARY

The foregoing lens module using the plate spring has the following disadvantage.

The upper and the lower plate springs for holding the lens holder are very weak against impact from outside from the properties, and are ruptured or fatigue-broken (aging degradation) during use.

Further, when the lens holder is assembled, the alignment of the upper and the lower plate springs is very difficult.

In addition, although the supported lens holder is not allowed to be tilted, when lens holder is supported by the upper and the lower plate springs, the possibility of tilting is high when the center of gravity shifts. When the lens holder is tilted, an image taken by a camera is partially blurred, and the function of the camera can not be satisfied.

Thus, it is desirable to provide a lens module and a camera, which is strong against impact from outside, is less subjected to aging degradation, is easily assembled and enables a lens holder to be arranged with high accuracy.

An embodiment of the present disclosure is directed to a lens module including a lens forming an image of an object; a lens holder to hold an outer peripheral side of the lens to allow reciprocal movement in an optical axis direction of the lens; a housing at least one end side of which is opened, which includes a cylindrical receiving part having an inner surface, one surface of which, at a lateral side, contacts one surface of the lens holder at the lateral side perpendicular to the optical axis direction, and which receives the lens holder in the receiving part to allow reciprocal movement in the optical axis direction of the lens and in a sliding state; and an actuator part including a movable part which is displaced by a displacement amount corresponding to a level of an applied drive voltage and reciprocates the lens holder received in the housing between a first position and a second position in the optical axis direction.

Another embodiment of the present disclosure is directed to a camera including a solid-state imaging device, and a lens module to form an image of an object on the solid-state imaging device, and the lens module includes a lens forming the image of the object, a lens holder to hold an outer peripheral side of the lens to allow reciprocal movement in an optical axis direction of the lens, a housing at least one end side of which is opened, which includes a cylindrical receiving part having an inner surface, one surface of which, at a lateral side, contacts one surface of the lens holder at the lateral side perpendicular to the optical axis direction, and which receives the lens holder in the receiving part to allow reciprocal movement in the optical axis direction of the lens and in a sliding state, and an actuator part including a movable part which is displaced by a displacement amount corresponding to a level of an applied drive voltage and reciprocates the lens holder received in the housing between a first position and a second position in the optical axis direction.

According to the embodiments of the present disclosure, the lens module is strong against impact from outside, is less subjected to aging degradation, is easily assembled, and can arrange the lens holder with high accuracy.

BRIEF DESCRIPTION OF THE DRAWINGS

FIGS. 2A to 2C are views showing a structural example of a lens module of a first embodiment of the present disclosure.

DETAILED DESCRIPTION

Figure 1:
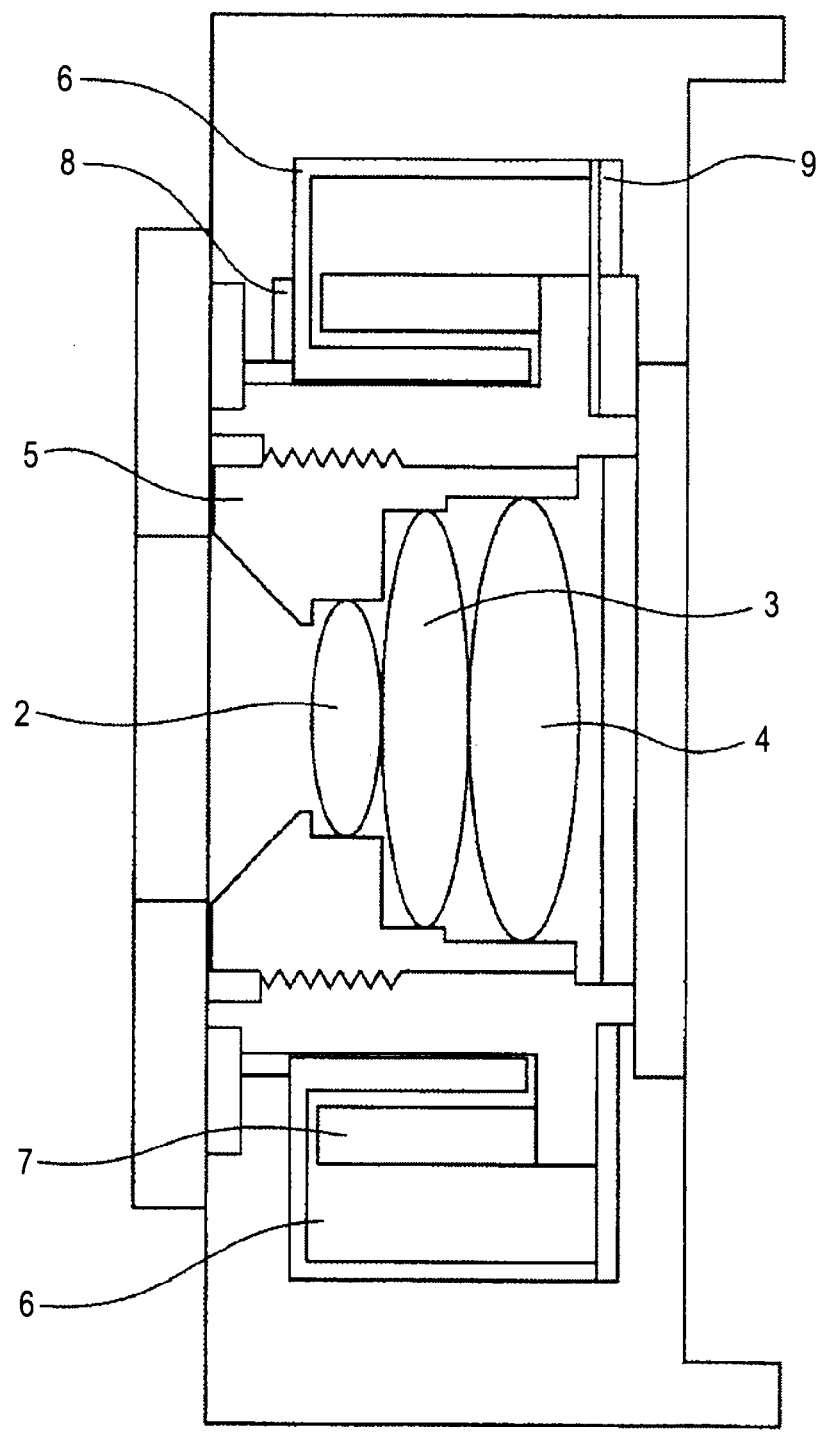
FIG. 1 is a view showing a lens module of a general VCM (Voice Coil Motor) system.

Hereinafter, embodiments of the present disclosure will be described with reference to the drawings.

The description will be made in the following sequence.

1. First embodiment (first structural example of a lens module)

2. Second embodiment (second structural example of a lens module)

3. Third embodiment (third structural example of a lens module)

4. Fourth embodiment (fourth structural example of a lens module)

5. Fifth embodiment (fifth structural example of a lens module)

6. Sixth embodiment (sixth structural example of a lens module)

7. Structural example of a camera

<1. First Embodiment>

FIGS. 2A to 2C are views showing a structural example of a lens module of a first embodiment of the present disclosure.

FIG. 2A is a top view of the lens module of the first embodiment, FIG. 2B is a sectional view of the lens module of the first embodiment, and FIG. 2C is a side view of the lens module of the first embodiment.

The lens module 100 includes a lens 110, a lens holder 120, a housing 130 and an actuator part 140.

Besides, in the lens module 100, a solid-state imaging device 200 on which an object image is formed is arranged at a non-object side indicated by reference character NOBJS in FIGS. 2B and 2C.

The solid-state imaging device 200 is formed of a CCD, a CMOS image sensor or the like.

The lens 110 is formed of one or plural optical lenses, and forms an image of an object at an object side indicated by reference character OBJS in FIGS. 2B and 2C on an imaging surface of the solid-state imaging device 200.

The lens holder 120 is formed into a cylindrical shape in which both surfaces in an axial direction are opened. In order to realize an auto-focus function, an inner surface part of the lens holder at a lateral side perpendicular to an optical axis direction OXD of the lens 110 holds an outer peripheral side of the lens 110 so as to allow reciprocal movement in the optical axis direction OXD.

The housing 130 of this embodiment is formed integrally with a base, and a cylindrical receiving part 132 opened at both ends at the object side OBJS and the non-object side NOBJS in FIGS. 2B and 2C is formed at the center of a base 131 having a flange part.

The outer appearance part of the housing the inner surface of which demarcates the cylindrical receiving part 132 is formed into a prismatic shape. The shape of the housing 130 including the receiving part 132 is made the prismatic shape as an example, and may be another shape such as a cylindrical shape.

The housing 130 of this embodiment is formed of a member of low friction coefficient. One surface of the housing at the lateral side contacts one surface of the lens holder 120 at the lateral side, and the housing receives the lens holder 120 so as to allow reciprocal movement in the optical axial direction OXD of the lens 110 and in a sliding state.

Specifically, an inner surface 132a of low friction coefficient contacts an outer surface 121 of the lens holder 120 at the lateral side, and the housing 130 of the first embodiment receives the lens holder 120 so as to allow the reciprocal movement in the optical axis direction PXD of the lens 110 and in the sliding state.

In this case, a slide (sliding) surface SLD is formed by the outer surface 121 of the lens holder 120 and the inner surface 132a of the housing 130.

A reduction in the friction coefficient of the inner surface 132a of the housing 130 is realized by applying, for example, a lubricant, and this enables sliding.

That is, in the first embodiment, a part of the base functions as the housing 130, and the inner surface 132a constituting the receiving part 132 becomes slidable by the lubricant.

In the first embodiment, the lens holder 120 is assembled in the housing 130 while a gap of several microns is provided, and the tile is ensured here.

The actuator part 140 includes a movable part 141 which is displaced by a displacement amount corresponding to the level of an applied drive voltage, and reciprocates the lens holder 120 received in the housing 130 between a first position PS1 and a second position PS2 in the optical axis direction OXD shown in FIG. 2B.

The drive voltage DRV is applied by a not-shown control system.

The actuator part 140 of the first embodiment includes, in addition to the movable part 141, a long hole-shaped opening 142 which is long in the optical axis direction OXD and is formed in a part of the side part of the housing 130, and a fixed support part 143 which is formed on the surface of the base 131 of the housing 130 at the object side.

In the first embodiment, the movable part 141 is formed of a polymer actuator 150 as a rod-shaped or a sheet-shaped needle.

The polymer actuator 150 includes an ion conductive polymer film impregnated with positive ion material, and an electrode film provided on each of both surfaces of the ion conductive polymer film. When a voltage is applied between the electrode films, the ion conductive polymer film is bent (curved) or deformed.

One end of the polymer actuator 150 is coupled to the side part of the lens holder through the opening 142 formed in the housing 130 so that the displacement movement can be transmitted.

In this case, a hole or a notch is formed in a part of the lens holder 120, and the one end of the polymer actuator 150 is directly inserted in the portion, and is coupled so that the displacement movement can be transmitted.

The other end of the polymer actuator 150 is fixed to the fixed support part 143.

For example, an electrode is provided near the fixed support part 143, and the drive voltage is applied to the electrode, so that the polymer actuator 150 is bent (curved). Thereby, the lens holder 120 is reciprocated in the optical axis direction OXD and the auto-focus mechanism is realized.

Hereinafter, a structure of the polymer actuator of the embodiment of the present disclosure will be described.

Figure 3:
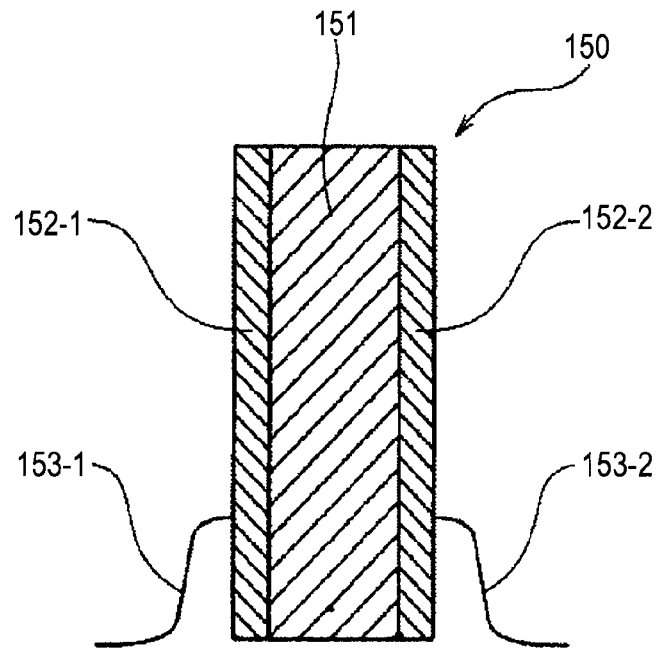
FIG. 3 is a sectional view showing a structural example of a polymer actuator of an embodiment of the present disclosure.

FIG. 3 is a sectional view showing a structural example of the polymer actuator of the embodiment of the present disclosure.

As shown in FIG. 3, the polymer actuator 150 includes an ion conductive polymer membrane (ion conductive polymer film) 151 impregnated with positive ion material, and electrode films 152-1 and 152-2 respectively provided on both surfaces of the ion conductive polymer film 151.

The polymer actuator 150 includes lead wires 153-1 and 153-2 respectively electrically connected to the electrode films 152-1 and 152-2.

In the polymer actuator 150, a voltage is applied between the electrode films 152-1 and 152-2 by the pair of the lead wires 153-1 and 153-2, so that the ion conductive polymer film 151 is bent (curved) or deformed.

The ion conductive polymer film 151 is made of fluorine resin or ion exchange resin having a hydrocarbon as a skeleton, and has a shape having the front and back two main surfaces. The shape includes, for example, a reed shape, a disk shape, a columnar shape and a cylindrical shape.

Besides, as the ion exchange resin, although any of a negative ion exchange resin, a positive ion exchange resin and both ion exchange resin may be used, the positive ion exchange resin is preferable.

As the positive ion exchange resin, a resin is mentioned in which a functional group, such as a sulfonic acid group or a carboxyl group, is introduced in polyethylene, polystyrene, fluorine resin or the like. Especially, the positive ion exchange resin in which the functional group, such as the sulfonic acid group or the carboxyl group, is introduced in the fluorine resin is preferable.

The electrode film 152 (-1, -2) is made of carbon powders and ion conductive resin, and the carbon powders are bonded to each other through the ion conductive resin.

The carbon powder is fine powder of carbon black having conductivity. As the specific surface area becomes large, the surface area in which the electrode film 152 contacts the ion conductive polymer film 151 becomes large, and a larger deformation amount can be obtained. For example, ketjen black is preferable. Besides, the ion conductive resin may be the same material as the material constituting the ion conductive polymer film 151.

Besides, the electrode film 152 (−1, −2) is formed such that a coating material including an ion conductive resin component and carbon powder is applied to the ion conductive polymer film 151. Alternately, the electrode film 152 (−1, −2) is formed such that a conductive film made of carbon powder and ion conductive resin is pressure bonded to the ion conductive polymer film 151.

In any method, the electrode film 152 can be simply formed in a short time.

Incidentally, at least the ion conductive polymer film 151 is impregnated with the positive ion material, and the positive ion material is preferably water and metal ion, water and organic ion, or ionic liquid.

Here, the metal ion includes, for example, sodium ion, potassium ion, lithium ion and magnesium ion. The organic ion includes, for example, alkylammonium ion.

These ions exist as hydrate in the ion conductive polymer film 151. In the case of the ion conductive polymer film 151 contains water and metal ion, or water and organic ion, and is in a hydrous state, the polymer actuator 150 is preferably sealed so that the water does not vaporize.

The ionic liquid is a solvent containing only nonflammable and nonvolatile ions and called a room temperature molten salt. For example, an imidazolium ring-based compound, a pyridinium ring-based compound, or an aliphatic compound can be used.

When the ion conductive polymer film 151 is impregnated with the ionic liquid, the polymer actuator 150 can be used even in high temperature or vacuum without worrying about volatilization.

Figures 4A, 4B, 4C:
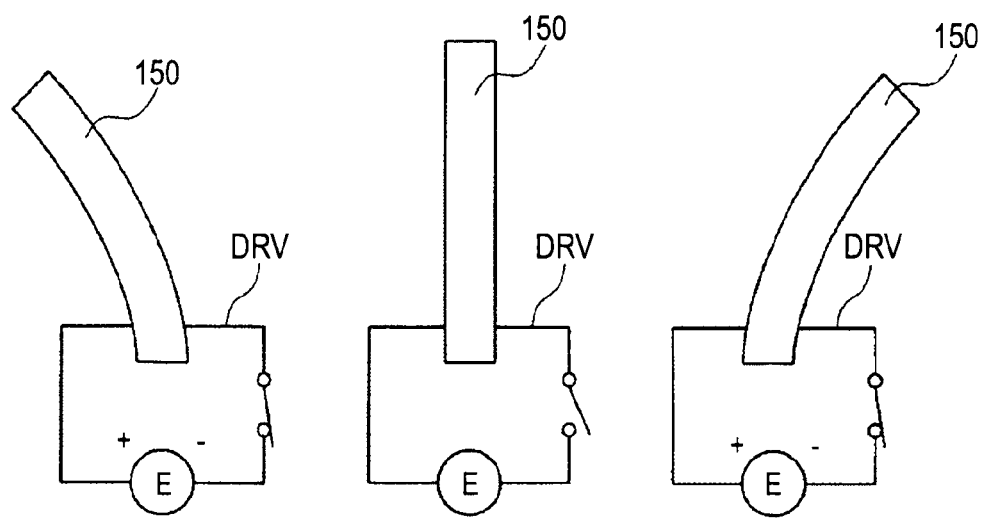
FIGS. 4A to 4C are views for explaining the operation principle of the polymer actuator of the embodiment of the present disclosure.

FIGS. 4A to 4C show the operation principle of the polymer actuator 150 of this embodiment. Here, it is assumed that the ion conductive polymer film 151 is impregnated with sodium ions.

In FIG. 4A, a plus potential is applied to the electrode film 152-1 of the polymer actuator 150 at the left side in the drawing, and a minus potential is applied to the electrode film 152-2 at the right side in the drawing through the lead wires 153-1 and 153-2 from a power source E.

By this potential difference, in the ion conductive polymer film 151 of the polymer actuator 150, the sodium ion hydrate is attracted to the electrode film 152-2 at the side (right side in the drawing) to which the minus potential is applied and is moved. By this, the sodium ion hydrate is concentrated in the vicinity of the electrode film 152-2, and this region expands in volume.

On the other hand, the concentration of the sodium hydrate in the vicinity of the electrode film 152-1 at the side (left side in the drawing) to which the plus potential is applied is decreased, and this area contracts in volume.

As a result, a volume difference occurs between the areas near the two electrode films 152-1 and 152-2 of the ion conductive polymer film 151, and the ion conductive polymer film 151 is curved to the left side in the drawing.

In this case, for example, the lens holder 120 slides in the housing 130 and in the optical axis direction OXD toward the first position PS1.

In FIG. 4B, voltage application from the power source E is not performed, and there is no potential difference between the two electrode films 152-1 and 152-2. As a result, a volume difference does not occur between the areas near the two electrode films 152-1 and 152-2 of the ion conductive polymer film 151, and the ion conductive polymer film 151 is not curved but maintains the straight state.

In this case, the state of FIGS. 2A to 2C occurs. That is, the lens holder 120 does not slide in the housing 130 and is kept at the stable position.

Alternately, the lens holder 120 returns to the stable position from the first position PS1 or the second position PS2.

In FIG. 4C, a minus potential is applied to the electrode film 152-1 of the polymer actuator 150 at the left side in the drawing, and a plus potential is applied to the electrode film 152-2 at the right side in the drawing through the lead wires 153-1 and 153-2 from the power source E, and the application method is opposite to that of the case of FIG. 4A.

By this potential difference, in the ion conductive polymer film 151 of the polymer actuator 150, the area near the electrode film 152-1 at the side (left side in the drawing) to which the minus potential is applied expands in volume, and the area near the electrode film 152-2 at the side (right side in the drawing) to which the plus potential is applied contracts in volume.

As a result, the ion conductive polymer film 151 is curved to the right side in the drawing.

In this case, for example, the lens holder 120 slides in the housing 130 and in the optical axis direction OXD toward the second position PS2.

The deformation performance (deformation amount and/or deformation speed) of the polymer actuator 150 can be controlled by adjusting at least one of the specific surface area of carbon powder, the solid content weight ratio of carbon powder to ion conductive resin, and the thicknesses of the two electrode films 152.

Besides, the deformation performance (deformation amount and/or deformation speed) of the polymer actuator 150 can also be controlled by adjusting the ratio of the thickness of the electrode film 152 to the thickness of the ion conductive polymer film 151.

Next, another structure of the polymer actuator of the embodiment of the present disclosure will be described.

Figure 5:
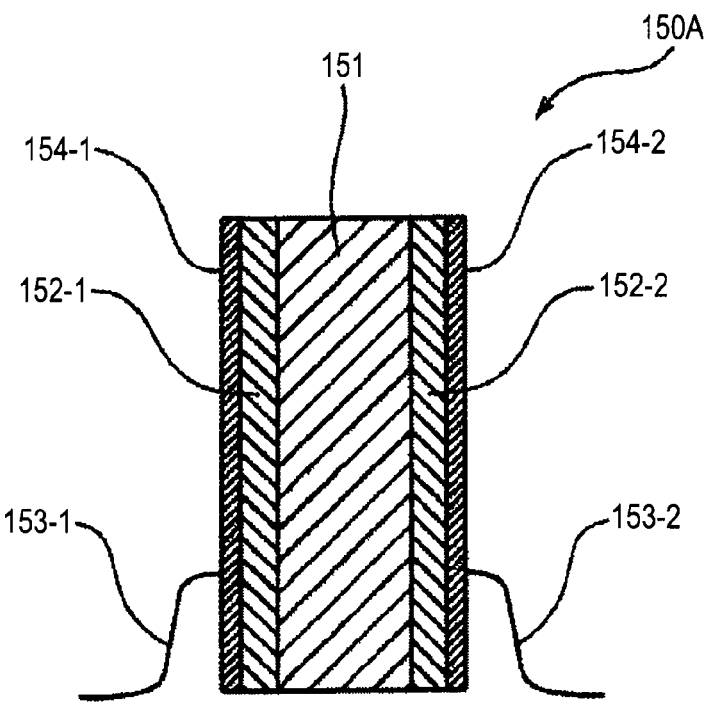
FIG. 5 is a sectional view showing another structural example of the polymer actuator of the embodiment of the present disclosure.

FIG. 5 is a sectional view showing another structural example of the polymer actuator of the embodiment of the present disclosure.

In a polymer actuator 150A of FIG. 5, metal conductive films 154-1 and 154-2 made of gold or platinum are respectively formed on the pair of the electrode films 152-1 and 152-2 of the polymer actuator 150 of FIG. 3.

Lead wires 153-1 and 153-2 are electrically connected to the metal conductive films 154-1 and 154-2.

Here, positive ion material impregnated in the ion conductive polymer film 151, the electrode films 152-1 and 152-2, and the ion conductive polymer film 151 is the same as that shown in the polymer actuator 150 of FIG. 3.

Here, with respect to the metal conductive films 154-1 and 154-2, gold or platinum thin films are formed on the pair of the electrode films 152-1 and 152-2 by a film formation method such as a wet plating method, an evaporation method, or a sputtering method.

Although the thicknesses of the metal conductive films 154-1 and 154-2 are not particularly limited, it is preferable that the thicknesses are of such a degree that continuous films are obtained and potentials from the lead wires 153-1 and 153-2 are uniformly applied to the electrode films 152-1 and 152-2.

By the above structure, more excellent deformation performance can be obtained with high reliability.

As stated above, in order to realize the auto-focus of the lens module 100, the lens is required to be reciprocated in the object direction.

The first embodiment includes the structure in which a plate spring having a complicated shape can be eliminated when the lens holder 120 including the lens 110 is supported.

That is, in the lens module 100 of the first embodiment, the outer surface part of the side part of the lens holder 120 is covered by the inner surface 132a of the housing 130 of low friction coefficient, and is slid, so that the reciprocate support mechanism for the auto focus is realized.

In the first embodiment, for example, the movable part of the polymer actuator is attached to the protruding movable part 141, so that the auto focus is realized.

As stated above, in the first embodiment, since the lens holder is supported by the sliding surface, the resistance against impact is very high, and there is no concept of fatigue.

The assembly of the lens holder 120 to the housing 130 is realized by merely inserting it into the housing 130 and is simple.

Besides, when the housing 130 and the base are integrated or are formed by insert molding, the module outer shape can be made small as compared with the outer diameter of the lens holder 120, and the miniaturization of the module can be realized.

<2. Second Embodiment>

Figure 6:
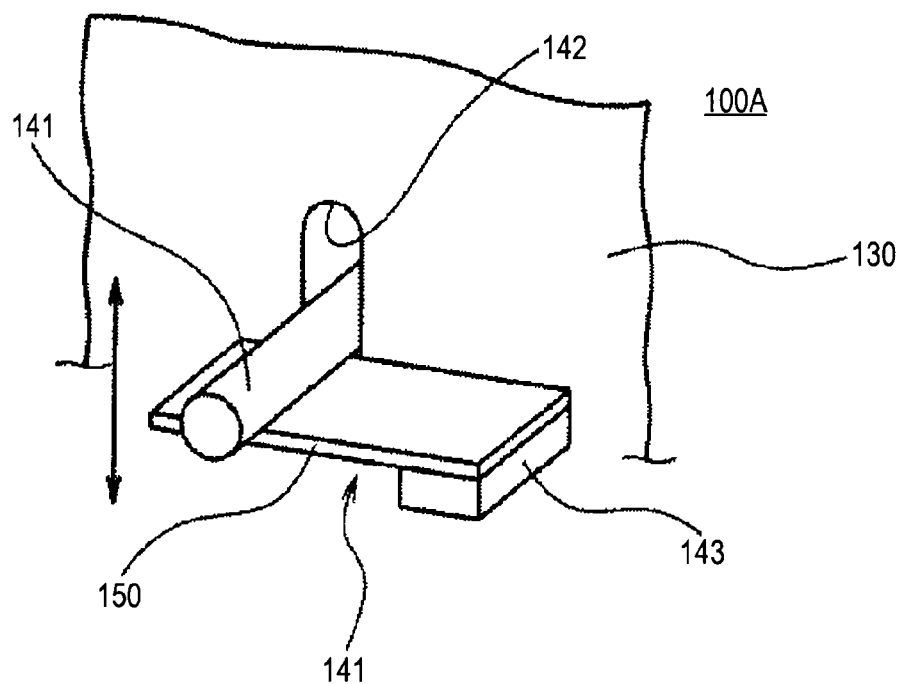
FIG. 6 is a view showing a structural example of a lens module of a second embodiment of the present disclosure.

FIG. 6 is a view showing a structural example of a lens module of a second embodiment of the present disclosure.

In FIG. 6, in order to explain portions different from the lens module 100 of the first embodiment of FIG. 2, the different portions are extracted and shown.

A lens module 100A of the second embodiment is different from the lens module 100 of the first embodiment in the following points.

In the lens module 100 of the first embodiment, one end of the polymer actuator 150 forming the movable part 141 is directly coupled to the side part of the lens holder 120, and directly transmits the displacement movement.

On the other hand, in the lens module 100A of the second embodiment, one end of a movable pin 144 is coupled to a side part of a lens holder 120, and the other end is positioned at the outside of a housing 130 through an opening 142.

In the lens module 100A, one end of a polymer actuator 150 is coupled by adhesion or the like at the outside, and the other end is fixed to a fixed support part 143.

As stated above, in the lens module 100A of the second embodiment, the displacement movement of the polymer actuator 150 is transmitted to the lens holder 120 through the movable pin 144.

The other structure is the same as the first embodiment.

According to the second embodiment, the same effects as the first embodiment can be obtained.

<3. Third Embodiment>

Figure 7:
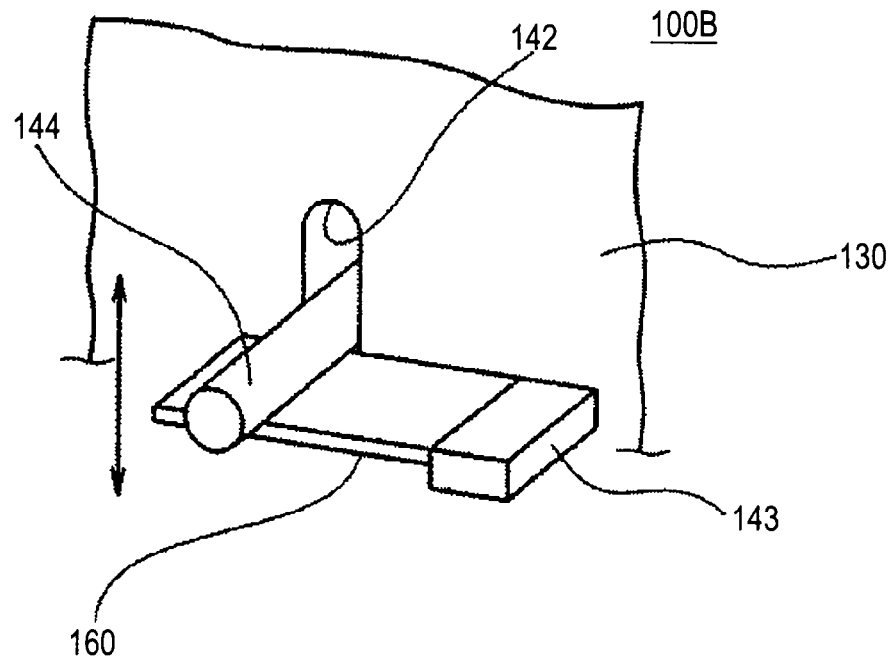
FIG. 7 is a view showing a structural example of a lens module of a third embodiment of the present disclosure.

FIG. 7 is a view showing a structural example of a lens module of a third embodiment.

In FIG. 7, in order to describe portions different from the lens module 100A of the second embodiment of FIG. 6, different portions are extracted and shown.

A lens module 100B of the third embodiment is different from the lens module 100A of the second embodiment in the following points.

In the lens module 1002 of the third embodiment, a bimorph (bimetal) PZT 160 is used instead of the polymer actuator.

Also in this case, one end of the bimorph (bimetal) PZT 160 is attached to a movable pin 144, and the other end is fixed to a fixed support part 143.

An electrode is provided near the fixed support part 143, and a voltage is applied to the electrode, so that the bimorph (bimetal) PZT 160 is bent (curved). Thereby, the movable pin 144 is moved in the optical axis direction, and the auto focus mechanism is obtained.

The other structure is the same as the first and the second embodiment.

According to the third embodiment, the same effects as the first embodiment can be obtained.

<4. Fourth Embodiment>

Figure 8:
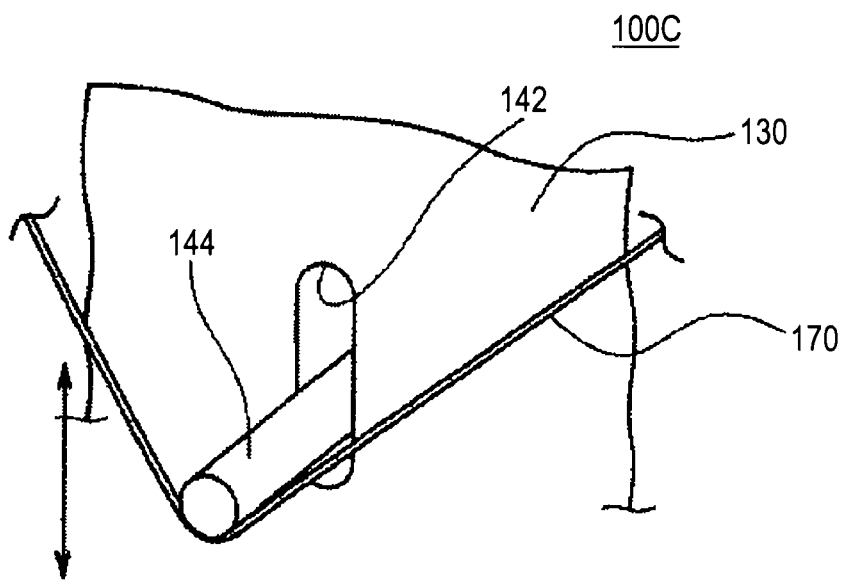
FIG. 8 is a view showing a structural example of a lens module of a fourth embodiment of the present disclosure.

FIG. 8 is a view showing a structural example of a lens module of a fourth embodiment of the present disclosure.

In FIG. 8, in order to describe portions different from the lens module 100A of the second embodiment of FIG. 6, the different portions are extracted and shown.

A lens module 100C of the fourth embodiment is different from the lens module 100A of the second embodiment in the following points.

The lens module 100C of the fourth embodiment uses a shape-memory-alloy wire 170 instead of the polymer actuator.

In this case, as shown in FIG. 8, the shape-memory-alloy wire 170 is hooked on a movable pin 144 and is coupled.

Electrodes are provided at both ends of the shape-memory-alloy wire 170, and when a voltage is applied to the electrodes, the shape-memory-alloy wire 170 becomes short, and when the application of the voltage is stopped, the shape-memory-alloy wire is cooled and becomes long. Thereby, the movable pin 144 is moved in the optical axis direction and the auto focus mechanism is obtained.

The other structure is the same as the first and the second embodiment.

According to the fourth embodiment, the same effects as the first embodiment can be obtained.

<5. Fifth Embodiment>

Figure 9:
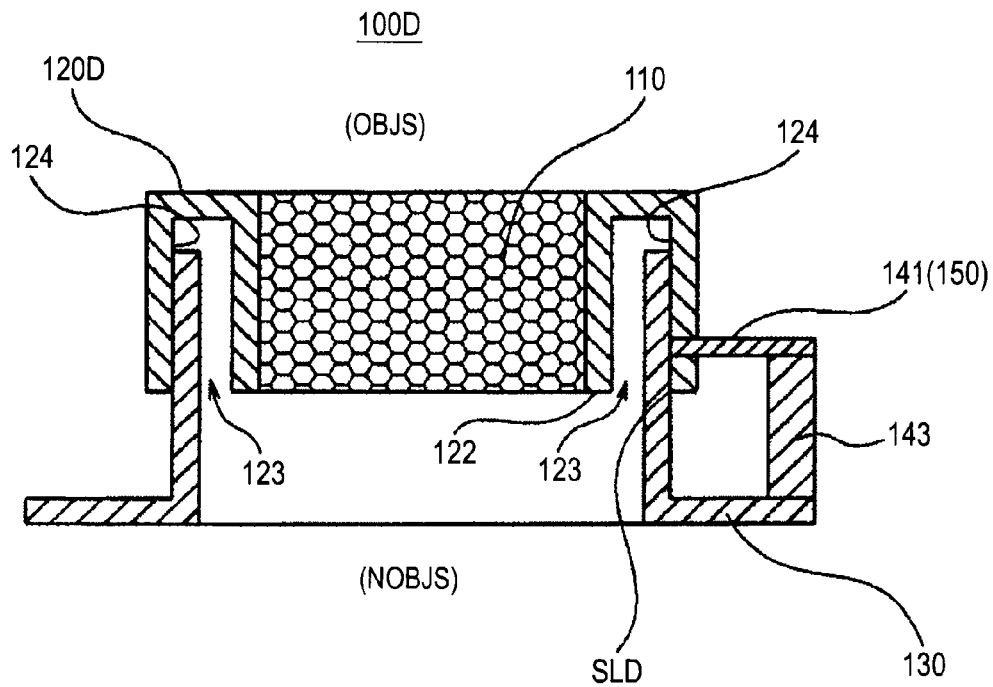
FIG. 9 is a sectional view showing a structural example of a lens module of a fifth embodiment of the present disclosure.

FIG. 9 is a sectional view showing a structural example of a lens module of a fifth embodiment of the present disclosure.

A lens module 100D of the fifth embodiment is different from the lens module 100 of the first embodiment in the following points.

Basically, in the housing 130 of the embodiment, one surface thereof at the lateral side contacts one surface of the lens holder 120 at the lateral side, and the housing receives the lens holder 120 to allow reciprocal movement in the optical axis direction OXD of the lens 110 and in the sliding state.

Based on this, in the housing 130 of the first embodiment, the inner surface 132a of low friction coefficient contacts the outer surface 121 of the lens holder 120 at the lateral side, and the housing receives the lens holder 120 to allow reciprocal movement in the optical axis direction PXD of the lens 110 and in the sliding state.

On the other hand, in a housing 130D of the fifth embodiment, an outer surface thereof contacts an inner and outer surface of an insertion part of a lens holder 120D at a lateral side, and the housing receives the lens holder to allow reciprocal movement in the optical direction of the lens and in the sliding state.

A structure of the lens module 100D will be described.

The lens holder 120D includes an insertion part 123 formed as an opening having a length longer than a distance between a first position and a second position, in which a side wall of a housing is insertable from a surface 122 at a non-object side NOBJS in an optical axis direction of a held lens 110.

A side wall part of the housing 130D at the object side is inserted in the insertion part 123.

An outer surface 133 of the housing 130O contacts an inner and outer surface 124 of the insertion part 123 of the lens holder 120D at the lateral side, and the housing receives the lens holder 120D to allow reciprocal movement in the optical axis direction of the lens 110 and in the sliding state.

In this case, since the lateral outer peripheral surface of the lens holder 120D is the outermost part, one end of the polymer actuator 150 is directly coupled without passing through an opening or the like.

The other structure is the same as the first embodiment.

According to the fifth embodiment, the same effects as the first embodiment can be obtained.

Incidentally, in the fifth embodiment, even if a particle is generated from the slide surface, there is no fear that it drops to a surface of an imaging surface of a solid-state imaging device 200.

Besides, the structure of the second to the fourth embodiment using the movable pin can be applied.

<6. Sixth Embodiment>

Figure 10:
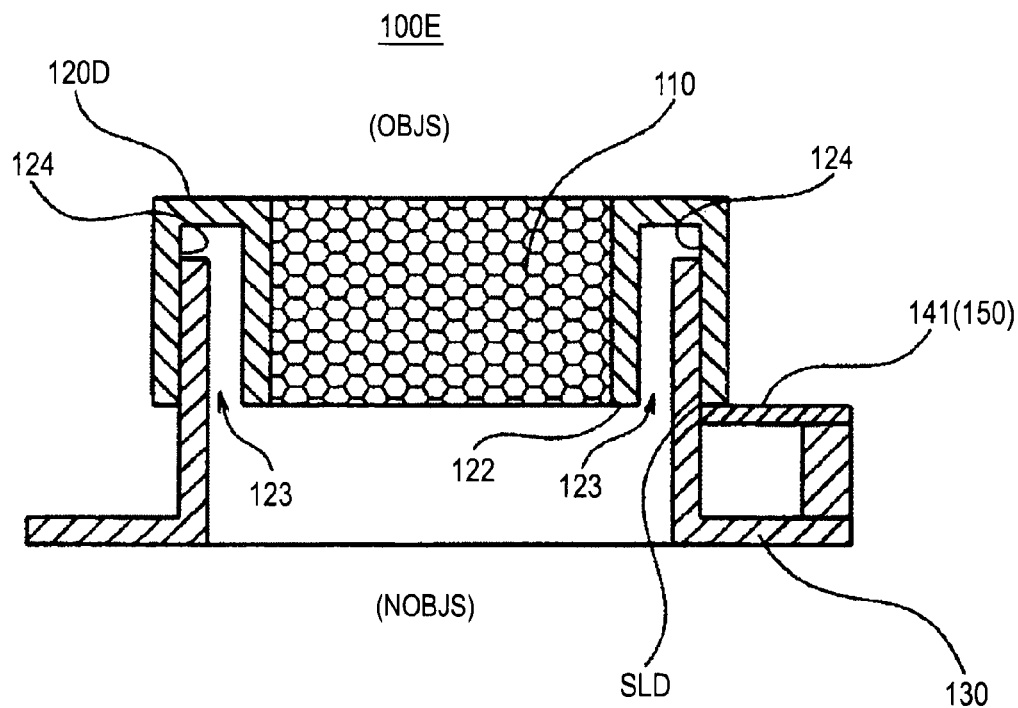
FIG. 10 is a sectional view showing a structural example of a lens module of a sixth embodiment of the present disclosure.

FIG. 10 is a sectional view showing a structural example of a lens module of a sixth embodiment of the present disclosure.

A lens module 100E of the sixth embodiment is different from the lens module 100D of the fifth embodiment in following points.

A polymer actuator 150 is not coupled to a lens holder 120D at a side part, but is coupled to enable displacement movement to be transmitted to a surface 122 of the lens holder 120D at a non-object side NOBJS in an optical axis direction of a held lens.

The other structure is the same as the fifth embodiment.

According to the sixth embodiment, the same effects as the first embodiment can be obtained.

The structure of the sixth embodiment can be realized also in the case of the first to the fifth embodiment by securing a space where the movable part can be arranged so as to contact the surface at the non-object side NOBJS in the optical axis direction.

As described above, according to this embodiment, the following effects can be obtained.

The plate spring to support the lens holder 120 including the lens is eliminated, the outer diameter part of the lens holder 120 is covered with the housing of low friction coefficient, and the lens holder is slid, so that the reciprocal support mechanism for the auto focus is realized.

The polymer actuator is directly attached to the lens holder or the movable part of the polymer actuator is attached to the protruding movable pin, so that the auto focus is realized. Instead of the polymer actuator, for example, the bimetal PZT element is attached to the protruding portion of the lens holder 120, so that the auto focus is realized. Besides, for example, the shape-memory-alloy wire is attached to the protruding portion of the lens holder, so that the auto focus is realized.

The upper and lower plate springs to support the lens holder 120 are very weak against impact from outside from the properties, and are fractured or are fatigue-broken during the use. Further, the alignment of the upper and lower plate springs at the time of assembly of the lens holder is very difficult.

In the embodiment, since the lens holder 120 is supported by the slide surface, the resistance against impact is very high, and there is no concept of fatigue. The assembly of the lens holder 120 is realized merely by insertion into the housing and is simple.

Besides, when the housing 120 and the base are integrated or are formed by insert molding, the module outer shape can be made small as compared with the outer diameter of the lens holder 120, and the miniaturization of the module can be realized.

In addition, the lens holder 120 and the housing 130 are assembled with a desired fit, and the reciprocal movement can be performed without tilting of the lens holder.

The lens module having the effects as stated above can be applied as a camera module (optical system) of a digital camera or a video camera.

<7. Structural Example of Camera>

Figure 11:
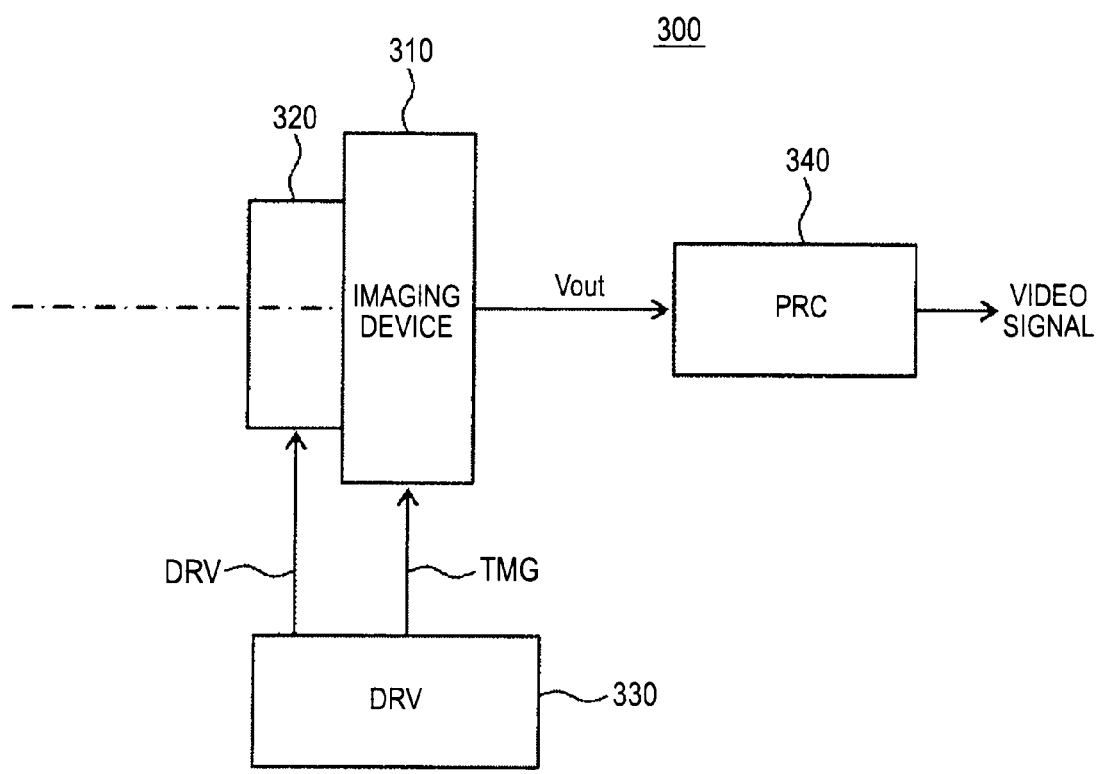
FIG. 11 is a view showing an example of a structure of a camera to which the camera module of the embodiment of the present disclosure is applied.

FIG. 11 is a view showing an example of a structure of a camera to which the lens module of the embodiment of the present disclosure is applied.

As shown in FIG. 11, a camera 300 includes, as an optical system to guide (form an object image) incident light to a pixel area of an imaging device 310, a lens module (optical system) 320 to form an image of incident light (image light) on an imaging surface. As the lens module (optical system) 320, the lens module of the embodiment is applied.

Further, the camera 300 includes a drive circuit (DRV) 330 to drive the imaging device 310 and an actuator part of the lens module 320, and a signal processing circuit (PRC) 340 to process output signals of the imaging device 310.

The drive circuit 330 generates a drive voltage DRV for drive-controlling the lens to allow reciprocal movement in the optical axis direction by the actuator part of the lens module 320, and supplies it to the actuator part.

The drive circuit 330 includes a timing generator (not shown) to generate various timing signals including a start pulse and a clock pulse to drive a circuit in the imaging device 310, and drives the imaging device 310 by a specified timing signal TMG.

Besides, the signal processing circuit 340 performs a specified signal processing on the output signal of the imaging device 310.

The image signal processed by the signal processing circuit 340 is recorded on a recording medium such as a memory. The image information recorded on the recording medium is hard copied by a printer or the like. Besides, the image signal processed by the signal processing circuit 340 is shown as a moving image on a monitor including a liquid crystal display or the like.

As described above, in the imaging device such as a digital still camera, the lens module described before is mounted as the lens module 320, so that the camera strong against impact from outside, not subjected to aging degradation, and having high accuracy can be realized.

The present disclosure contains subject matter related to that disclosed in Japanese Priority Patent Application JP 2010-170016 filed in the Japan Patent Office on Jul. 29, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens module comprising:
a lens forming an image of an object;
a lens holder to hold an outer peripheral side of the lens to allow reciprocal movement in an optical axis direction of the lens;
a housing at least one end side of which is opened, which includes a cylindrical receiving part having an inner surface, one surface of which, at a lateral side, contacts one surface of the lens holder at the lateral side perpendicular to the optical axis direction, and which receives the lens holder in the receiving part to allow reciprocal movement in the optical axis direction of the lens and in a sliding state, without any spring between the lens holder and the housing, and the one surface of the lens holder is free of protrusions to smoothly engage the one surface of the cylindrical receiving part; and
an actuator part including a movable part which is displaced by a displacement amount corresponding to a level of an applied drive voltage and reciprocates the lens holder received in the housing between a first position and a second position in the optical axis direction, the movable part is configured to bend when the movable part is applied with the applied drive voltage, and one end of the movable part is fixed outside of the housing.

2. The lens module according to claim 1, wherein an inner surface of the housing contacts an outer surface of the lens holder at the lateral side, and the housing receives the lens holder to allow the reciprocal movement in the optical axis direction of the lens and in the sliding state.

3. The lens module according to claim 2, wherein
an opening is provided in a part of a side part of the housing, and
one end of the movable part of the actuator part is coupled to a side part of the lens holder through the opening of the housing to allow transmission of displacement movement.

4. The lens module according to claim 2, wherein one end of the movable part of the actuator part is coupled to a surface of the lens holder at a non-object side in the optical axis direction of the held lens to allow transmission of displacement movement.

5. The lens module according to claim 1, wherein
the lens holder includes an insertion part formed as an opening having a length longer than a distance between the first position and the second position and insertable by a side wall of the housing from a surface at a non-object side in the optical axis direction of the held lens, and
an outer surface of the housing contacts an inner and outer surface of the insertion part of the lens holder at the lateral side, and the housing receives the lens holder to allow the reciprocal movement in the optical axis direction of the lens and in the sliding state.

6. The lens module according to claim 5, wherein one end of the movable part of the actuator part is coupled to a side part of the lens holder to allow transmission of displacement movement.

7. The lens module according to claim 5, wherein one end of the movable part of the actuator part is coupled to the surface of the lens holder at the non-object side in the optical axis direction of the held lens to allow transmission of displacement movement.

8. The lens module according to claim 1, wherein the movable part of the actuator part includes a polymer actuator which includes an ion conductive polymer film impregnated with a positive ion material, and electrode films provided on both surfaces of the ion conductive polymer film, and in which when a voltage is applied between the electrode films, the ion conductive polymer film is curved or deformed.

9. A camera comprising:
a solid-state imaging device; and
a lens module forming an image of an object on the solid-state imaging device, wherein
the lens module includes
a lens forming the image of the object,
a lens holder to hold an outer peripheral side of the lens to allow reciprocal movement in an optical axis direction of the lens,
a housing at least one end side of which is opened, which includes a cylindrical receiving part having an inner surface, one surface of which, at a lateral side, contacts one surface of the lens holder at the lateral side perpendicular to the optical axis direction, and which receives the lens holder in the receiving part to allow reciprocal movement in the optical axis direction of the lens and in a sliding state, without any spring between the lens holder and the housing, and the one surface of the lens holder is free of protrusions to smoothly engage the one surface of the cylindrical receiving part; and
an actuator part including a movable part which is displaced by a displacement amount corresponding to a level of an applied drive voltage and reciprocates the lens holder received in the housing between a first position and a second position in the optical axis direction, the movable part is configured to bend when the movable part is applied with the applied drive voltage, and one end of the movable part is fixed outside of the housing.

10. The lens module according to claim 1, wherein one end of the movable part is fixed relative to the housing, and an opposing end of the movable part is free and supports the lens holder, so that the movable part is cantilevered.

* * * * *